March 29, 1955   R. H. SANBORN   2,705,027
FULLY AUTOMATIC MACHINE FOR MAKING DOUBLE
BODIED TORSION COILED SPRINGS
Filed Dec. 1, 1950   8 Sheets-Sheet 3

INVENTOR.
ROBERT H. SANBORN
BY
*Louis W. [signature]*

March 29, 1955

R. H. SANBORN

2,705,027

FULLY AUTOMATIC MACHINE FOR MAKING DOUBLE
BODIED TORSION COILED SPRINGS

Filed Dec. 1, 1950

INVENTOR.
ROBERT H. SANBORN
BY

INVENTOR.
ROBERT H. SANBORN

March 29, 1955 R. H. SANBORN 2,705,027
FULLY AUTOMATIC MACHINE FOR MAKING DOUBLE
BODIED TORSION COILED SPRINGS
Filed Dec. 1, 1950 8 Sheets-Sheet 8

Fig. 23

INVENTOR.
ROBERT H. SANBORN
BY
*Louis W Helmuth*

United States Patent Office 2,705,027
Patented Mar. 29, 1955

2,705,027

FULLY AUTOMATIC MACHINE FOR MAKING DOUBLE BODIED TORSION COILED SPRINGS

Robert H. Sanborn, Rock Creek, Ohio

Application December 1, 1950, Serial No. 198,543

20 Claims. (Cl. 140—71)

This invention relates to new and useful improvements in apparatus for automatically making double torsion coiled springs.

An important object of the invention is to provide a fully automatic universal and versatile machine for the above purpose in which no manual attention or manipulation whatsoever is required or exercised in automatically making double bodied torsion coil springs at the rate of about 52 per minute or over 3000 per hour.

Another important object is the introduction into the spring making art of a new combination which contributes to this high speed production and which briefly consists of: (1) a main operating axis along which relatively movable arbor means and coiling heads are reciprocable to and from operative positions; (2) the provision of a wire bending device having a front wire bending portion spaced forwardly of said axis to have a wire length bent into a hairpin shape with a bight embracing this wire bending portion and a pair of arms extending rearwardly across said axis; and (3) the provision of arbor means movable longitudinally of this axis and relative to said coiling heads to and from an operative position wherein winding portions thereof extend at opposite sides of said bending device so that a coil spring can be wound on each winding portion, after which the arbor is moved to release the completed springs from the machine.

Another important object of the invention is to provide a machine of the above character which automatically and intermittently operates upon wire stock of unlimited length, to feed it to a spring forming position in predetermined lengths, each sufficient to form a complete double bodied torsion spring, where such length of wire is automatically bent into such formation that its ends may be automatically coiled into a double bodied torsion coil spring and thereafter such completed spring automatically falls from the machine, whereby it may continue in repeating cycles of operation to successively produce these springs.

A further important object of the invention is to provide novel apparatus including a non-rotatable reciprocatory arbor means operating through and/or between a pair of rotating axially projectable and retractable wire coiling heads, which later cooperate with relatively movable bending dies in the novel way of forming and setting the bight portion of said double bodied torsion spring into final shape so that it may be held in one fixed position relative to the machine by one of said dies while the coiling heads take up the simultaneous winding of the wire into double bodied springs, which when completed and set into form, fall into a depository by the arbor means automatically retracting into a coiling head to strip the completed double bodied spring from the machine during which later stage another length of wire stock is being fed into position to be moved by the movable die into engagement with the stationary bending die ready to successively form other springs.

Another important object of the invention is the provision of a novel relationship between an arbor axis and a fixed forward bending edge of a stationary wire bending die, whereby any rotational tendency of the wire blank and its bight about the arbor axis during winding of the coil on the arbor is prevented by this bight abutting said bending edge. Thus, with such relationship, and after a coiling head has engaged the arm of the wire blank to wind it into a coil, no separate clamping or other means is necessary to hold the blank in the machine and against rotation during winding of the coil. Also, by reason of this relationship, the coil when completed is in a position to fall from the machine when the arbor is withdrawn to its initial position without necessitating operation of any separate clamping means to release the blank from the machine.

A further object of the invention is to provide a machine of the above character having all of its essential wire working parts so arranged and coordinated, that they are accessibly disposed upon a supporting structure for easy adjustments for rapidly making helix or conical springs of different sizes and styles with open or closed coils, of various lengths and pitches and with variously shaped connecting bight portions, and also in order that all working parts are automatically coordinately operated by coordinated mechanisms to provide a fully automatic machine having immeasurable endurance and perfection of performance over long periods of time without requiring manual attention.

A further object of the invention is to provide in a fully automatic double bodied torsion spring making machine, a novel operating mechanism for rotating and reciprocating a pair of axially alined coiling heads, the rotation being first in one direction and then in the opposite direction with only instantaneous interruption between the reversals in direction of rotation; the coiling heads being simultaneously moved axially toward each other to form and set the bight of the spring at the beginning of the spring formation and again being similarly moved axially near the end of said formation to set the two coiled springs into axial alinement.

A still further object of the invention is to provide mechanism for rotating and axially moving the coiling heads relative to the arbor means or spindles, which mechanism is easily adjustable to vary the type, pitch and length of the coil springs and are coordinated with all other motions and mechanisms of the machine for causing axial pressures to be exerted upon the springs by the coiling heads to properly form the springs.

Another object of the invention is to provide a novel coiling head or heads which are provided with means for not only coiling the wire, but also for actually setting certain portions of the springs into completed form.

Other objects and advantages of the invention will become apparent during the course of the following description.

In the accompanying drawings forming a part of this description and wherein like numerals are employed to designate like parts through the several views.

The coiled spring manufacturing art has strived for many years to produce a fully automatic double torsion spring making machine, but to the best of my knowledge, not one has been produced which is fully automatic in its operation to produce these springs from wire stock of unlimited length without any stoppage of the machine or manual manipulation whatsoever from the raw continuous wire stock to the completed springs, and at a rate of over 3000 per hour. This continuous and constant speed of production is made possible in the present machine, by all parts and motions thereof being operated from a single source of power in timed mechanical co-ordination, so that all assistance by the human hand is entirely eliminated therefrom. It is accomplished in repeated cycles of the machine by intermittently feeding wire to a predetermined length sufficient to make a complete spring, to a central spring forming position or wire bending device, as rotating coiling heads and non-rotatable reciprocatory arbor means are approaching the same from initial positions spaced therefrom, and the wire length is being cut off and bent into appropriate shape by forming dies located to co-operate with the coiling heads and arbor means, whereby the two ends of the wire length are brought into position to be simultaneously engaged and wound into a pair of coiled springs upon the arbor, after the rotating heads and non-rotating arbor means reach operative positions in cooperative relation with the dies. The rotating coiling heads begin to recede from each other while the arbor means remains stationary until the two coiled springs of desired length are wound or coiled, whereupon the arbor means retract from inside of the springs faster than the coiling heads separate or retract, in order to release the springs from the arbor and the machine. The timed intermittent wire feed is so co-ordinated with the drive and other motions of the machine, that it starts to feed out the requisite length of wire while the coiling heads and arbor means which are relatively movable are retracting to strip the completed spring, so that these heads and arbor means can immediately start their approach to form another spring as soon as the formed spring is stripped or ejected. Also, during this approach, the movable die is again approaching its wire engaging position, while the arbor means is again projected to reach its operative spring forming position where winding portions thereof extend from opposite sides of the wire bending device prior to the complete approach of the die to its wire bending position and prior to the coiling heads reaching their spring winding positions. Thus, by this timed co-ordination of mechanical motions, with several of the motions operating simultaneously and with all human hand assistance eliminated, the speed of production of the machine is enhanced beyond all expectations. With this brief summary of the operation of the machine, we can proceed with greater understanding of the detailed construction of the various mechanism and motions.

Figures 3, 4, 20:
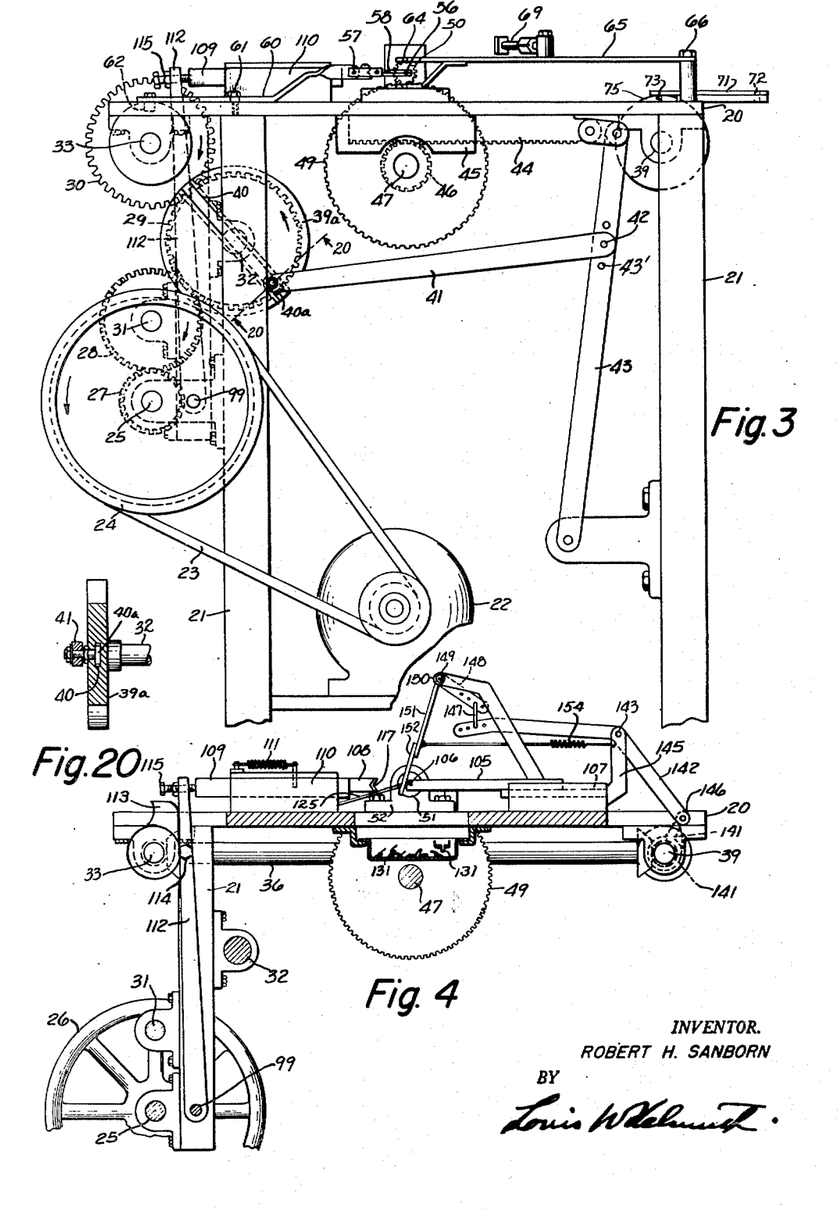
Fig. 3 is a right side elevation of the machine.
Fig. 4 is a transverse section of the machine taken on the line 4—4 of Figure 1.
Fig. 20 is a section taken on the line 20—20 of Fig. 3.

For a more complete explanation and description of this fully automatic machine, reference is first had to Figs. 1 through 4 of the drawings, wherein for the purpose of illustration and not limitation of the invention, is shown one practical operative form thereof. The numeral 20 designates a top or bed of the machine frame supported above the floor by suitably braced legs 21 and other bracing. As seen in Fig. 3, an electric motor 22, or other source of power is mounted upon a cross brace between legs, drives through a belt 23 to a pulley 24 keyed to a main drive shaft 25 mounted in suitable bearings horizontally across the front of the machine below the top thereof. At the left hand end of this shaft is a fly wheel 26 and between the shaft ends adjacent the right hand end, is keyed a small gear 27 of a gear train including gears 28, 29 and 30 having a ratio suitable for driving their respective horizontal shafts 31, 32 and 33 at any desired timed co-related speeds. Various speeds of these shafts may be obtained by simply changing the gear ratios. The uppermost shaft 33 has a beveled gear 34 meshing with a similar gear 35 keyed to the forward end of a horizontal shaft 36 extending fore and aft under the left hand side of the top 20, where its rear end is provided with a beveled gear 37 meshing with a similar gear 38 keyed to a second horizontal countershaft 39 mounted in a suitable bearing across the rear of the machine beneath the top thereof.

The countershaft 32 has keyed thereto at its right hand end, a driver disk or arm 39a with a diametrically extending slotted way or T-slot 40 in which is slidable and adjustable lengthwise, a block 40a as shown in Fig. 20. One end of a pitman arm 51 is pivoted to the block 40a. The pivot which connects the said end of the pitman 41 to the block 40a is a screw by which the block may be clamped in place. By sliding the block 40a lengthwise in the T-slot 40 and by tightening the screw, the block may be held at finely adjusted positions radially of the driver disk on either side of its center, to provide an adjustable eccentric connection. The other end of this pitman is adjustably connected at 42 along the intermediate portion of an upright lever 43 fulcrumed at its lower end to a suitable bracket, best seen in Fig. 3 or it may be connected directly to a rack 44. A series of apertures 43' is provided in the lever 43 for the adjustable connection of the pitman 41, which together with the adjustment permissible with the adjustable block 40, provides for adjustability of the throw of the lever 43 in either direction and consequently, the direction and extent thereof of rectilinear travel of a rack bar 44 oscillated in a suitable horizontal way 45 mounted on the underside of the machine top 20. This provides for varying the number of cycles of rotation in either direction of the coiling heads or spindles to be presently described. This rack oscillates a gear 46 keyed to a counter-shaft 47 extending horizontally across under the center of the top 20, which latter is provided with a pair of openings 48 for the extension therethrough of the upper portions of a pair of spur gears 49 keyed to the shaft 47. The upper portions of these spurs extend above the table top 20 to mesh with pinion formations 50 on the intermediate portions of a pair of axially aligned rotary and reciprocatory winding spindles 51 mounted in suitable bearings 52 on top of the machine across the approximate center thereof. These two winding spindles are thus rotated at the desired speed and for the desired number of revolutions in each direction by the adjustments above mentioned. Consequently, coiled springs having various number of coils or convolutions per spring can be produced by the machine by adjusting and clamping the pitman block connection longitudinally along the way 40. This block is suitably retained at any place along the way 40; and when moved from one side of the center of the disk 39a to the opposite side thereof the spur gears 49 and spindles 51 are caused to reverse their direction of rotation, so that the springs can wind the springs in either direction. Reciprocation of the spindles while rotating is obviously permissible by the integral pinion formations 50 sliding lengthwise of the teeth on the rotating gears 49. The construction and arrangement for reciprocating and rotating the spindles 51 and coiling heads 54 relative to the arbor means 56 constitutes part of a third automatic cyclically operable mechanism, hereinafter referred to.

Figure 10:
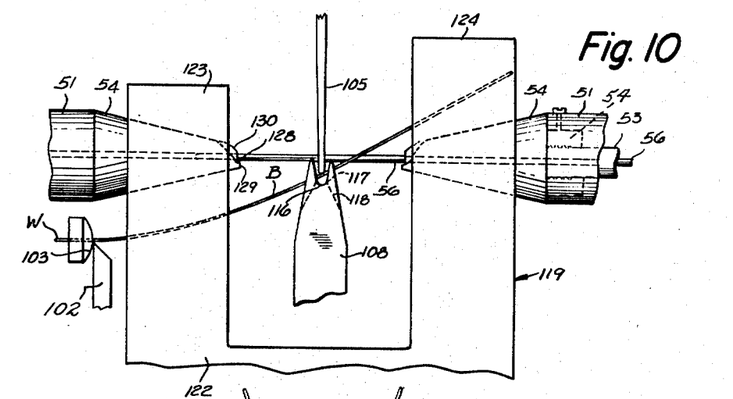
Fig. 10 is an enlarged top plan view of the elements shown in Fig. 9 and also of a cut-off device, this view showing the elements in a subsequent relationship wherein a predetermined length of wire requisite for the formation of a complete double torsion coiled spring is gripped between the stationary and movable dies and is ready to be severed and wherein the arbor is fully extended from one coiling head through the stationary die and into the other coiling head.

The rotary spindles 51 coiling heads 54, as stated before, are axially aligned and movable from spaced initial positions along the common longitudinal axis of said spindles to approach each other at a central spring formation station or wire bending device, and to recede at timed intervals to discharge the springs. Sliding axial movement of the spindles is provided by mounting each spindle in a pair of spaced apart bearings 52 located upon opposite sides of each opening 48 and pinion 50. Each spindle has an axial bore lengthwise through which extends a hollow shaft or draw-bar 53 terminating in a screw threaded into the inner end of a coiling or winding head 54 mounted on the inner end of each spindle. The outer end of each shaft 53 terminates in a wrench receiving end 55 so that it may be held while the coiling head is being removed or rotatively adjusted lengthwise thereof and locked thereon by a set screw extending radially through the spindle 51 and engaging the threaded end of the head 54 as shown in Fig. 10. Thus, the coiling head can be secured in adjusted fixed positions lengthwise of the outer spindle 51.

Figures 1, 1A, 1B, 1C:
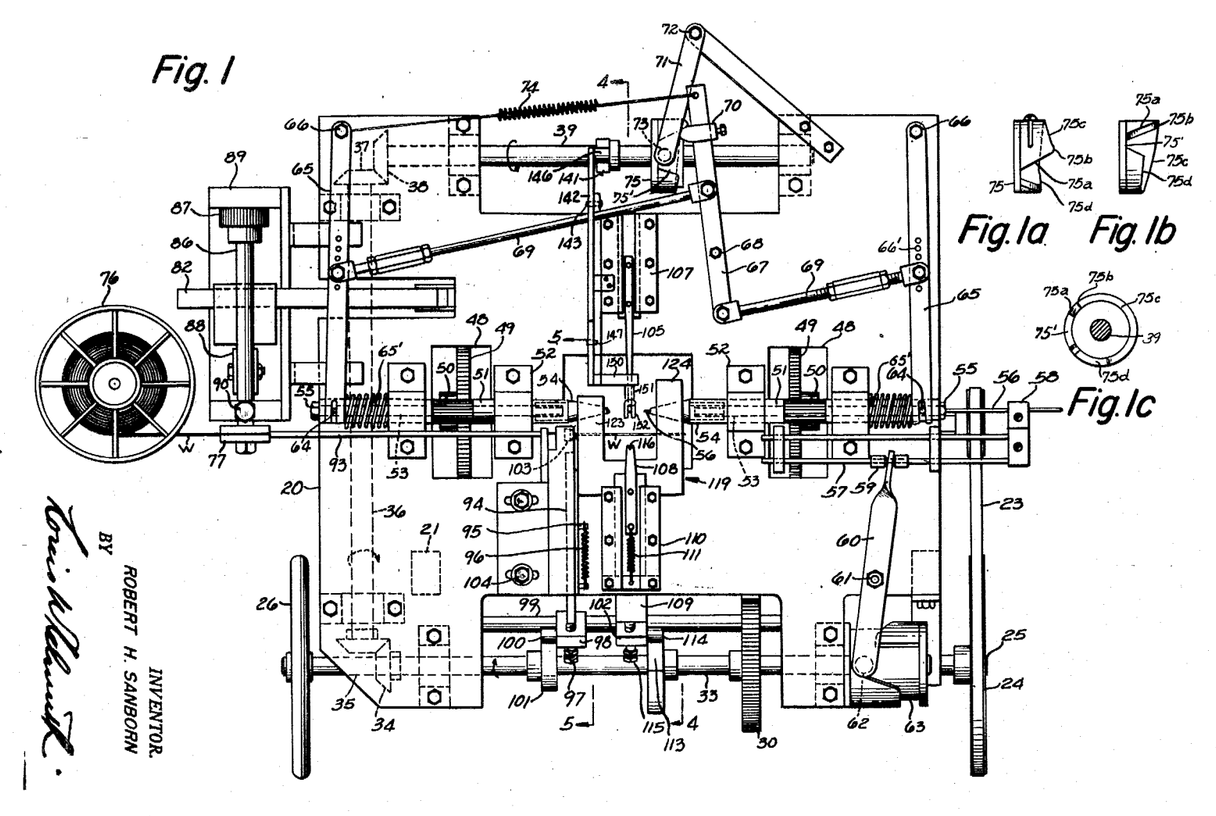
Fig. 1 is a top plan view of the automatic machine, this view showing all parts of the machine in the positions that they occupy at or about the completion of wire feeding.
Figs. 1a, 1b and 1c show three different views of the cam 75.
Figure 2:
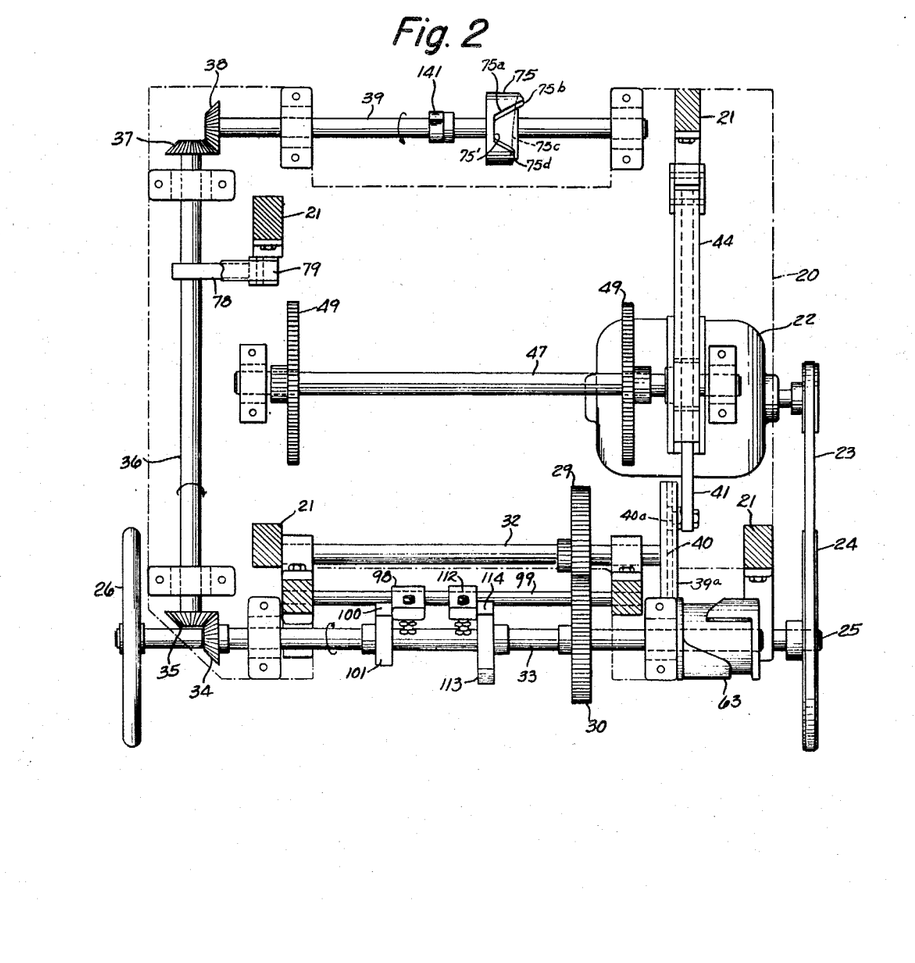
Fig. 2 is a horizontal section taken just beneath the bed or table top of the machine, showing the drive and operating mechanism for the machine.
Figure 23:
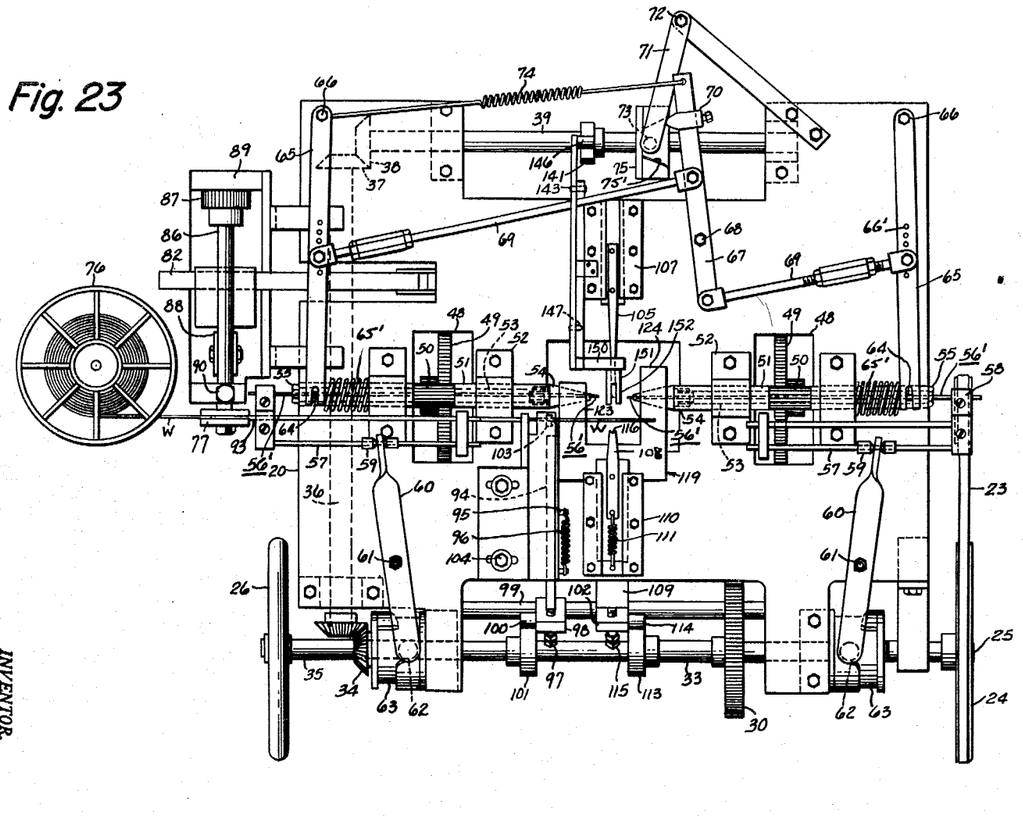
Fig. 23 is a view similar to Fig. 1 showing how a modified two-piece arbor and operating mechanism therefor may be incorporated in the machine.

Reciprocably mounted axially in the right-hand spindle and shaft 53 to move axially relative thereto is a non-rotatable arbor means 56 forming part of the wire coiling means and is reciprocated in timed relation to other motions of the machine, by a first automatic cyclically operable mechanism including a pair of guide rods 57 slidably mounted on the top 20 of the machine and having a connector clamp 58 adjustably connected to the arbor as best seen in Fig. 1. One of these guide rods 57 has a pair of abutments 59 adjustably mounted for lengthwise adjustment thereon and between which abutments operates the forked end of an actuator lever 60, fulcrumed at 61 upon the table top and having a depending roller 62 on its free end to operate in a track of a cylindrical cam 63 adjustably mounted on the right-hand end of the shaft 33. This arbor 56 is movable independently of the coiling heads and lengthwise of the common axis of these heads and is adapted to be advanced by this mechanism to project axially into the axial opening in the other complementary coiling head just prior to and during the spring coiling or winding operation and to retract therefrom and move axially into its axial opening in the other coiling head 54 to release completed springs therefrom. To provide for special coiling heads and tools to form variously shaped bight portions and/or types of springs, a separate arbor and arbor operating mechanism can be axially mounted in each spindle 51 as illustrated in Fig. 23, so that during arbor projection to operative positions, these two arbors 56′ will be moved axially by their respective arbor operating mechanism (57, 60 and 63) to approach each other from initial spaced positions at opposite sides of the die 105 and their free ends will be held in alignment in an operative position by coming to rest in the aperture 106 of this die. In such modification, a separate non-rotatable arbor 56′ and arbor operating mechanism (57, 60 and 63) exactly like that shown in Fig. 1 is duplicated and applied to the left-hand spindle 51 and coiling head 54 as illustrated in Fig. 23. In such case, the left-hand spindle 51 has an axial opening to receive a hollow shaft like 53 like the right-hand spindle 51 for slidably receiving the left-hand arbor 56′ as is obvious. After a spring is wound upon each separate arbor 56′, these two arbors are simultaneously retracted in opposite directions from their operative positions by their respective levers 60 and cams 63 to release the completed springs as described for Fig. 1.

Figure 14:
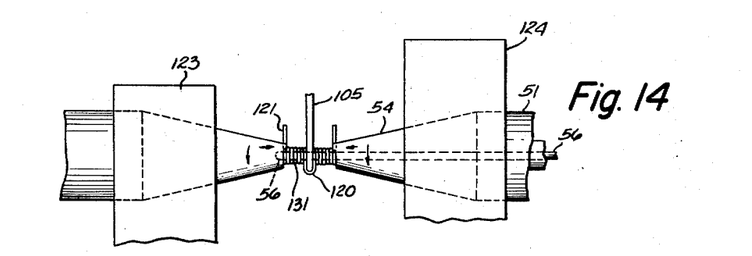
Fig. 14 is a view similar to Fig. 13 but showing the relative positions of the coiling heads after the ends of the wire length have been fully coiled upon the arbor and the coiling heads have reversed their direction of rotation and have been slightly moved axially toward one another to set the double torsion spring into final form, this view also showing the arbor partly retracted.

In order that the spindles and coiling heads may be simultaneously reciprocated at the proper timed intervals co-ordinated with the other motions of the machine, each spindle is provided with an annular groove retaining a C-shaped collar with a radial projection 64 to be received in the forked free end of an operating lever or crank 65. A shock absorbing compression coiled spring 65′ is positioned upon each spindle between its respective operating lever 65 and the adjacent bearing block 52 to cushion any undue stress and prevent malformation of the springs and prevent breakage of the associated parts. These two operating levers 65 are fulcrumed at 66 to the table top and are operated simultaneously by another part of the third automatic cyclically operable mechanism including a main lever 67 fulcrumed on the top at 68 and having turn-buckle rods 69 pivotally connected thereto on opposite sides of said fulcrum. The other ends of the rods 69 are pivotally and adjustably connected to a selected hole of a series 66′ in the intermediate portion of each lever 65. The lever 67 at its upper end is provided with a slidable adjustable connection or contact piece 70 which is adjustable along the length of the lever even while the machine is operating for the purpose of changing the pitch of the springs wound by the machine. This contact piece is held in contact with one side edge of a cam operated lever 71 fulcrumed at 72 and having its free end provided with a roller 73, by means of a coiled spring 74 stretched between the free end of the lever 67 and anchored at a suitable point. This lever 71 cooperates with the lever 67 and its contact piece 70 in forming a compound lever by which the throw of lever 67 can be adjusted to alter the movements of the levers 65 in order to change the pitch of the coiled springs as well as to wind either open or closed coils. The lever 67 at its upper end is provided with a slidable adjustable connection or contact piece 70 which is adjustable along the length of the lever even while the machine is operating for the purpose of changing the pitch of the springs wound by the machine. This contact piece is held in contact with one side edge of a cam operated lever 71 fulcrumed at 72 and having its free end provided with a roller 73, by means of a coiled spring 74 stretched between the free end of the lever 67 and anchored at a suitable point. This lever 71 cooperates with the lever 67 and its contact piece 70 in forming a compound lever by which the throw of lever 67 can be adjusted to alter the movements of the levers 65 in order to change the pitch of the coiled springs as well as to wind either open or closed coils. A cylindrical cam 75 rotatably adjustably mounted upon the shaft 39 operates the roller 73 and is so contoured as to provide the requisite reciprocatory axial movements of the spindles 51 and coiling heads 54 at the proper timed intervals to co-ordinate with the other motions and movements of the various parts. The track of the cam causes the coiling heads 54 to first approach toward the central wire bending device or station, then retract as the springs are wound, then approach each other about the thickness of the wire to compress the springs and remove the recoil as shown in Fig. 14, after which the heads 54 immediately separate to release the springs. Obviously, either lever 65 and its associated coiling head 54 can be inactivated by disconnecting either rod 69 from the holes 66′ in either lever 65.

This cam 75 is provided with a deep notch $75^1$ shown in Fig. 1 so that as it rotates counter-clockwise and moves the roller 73 up the inclined side 75a of the notch, the coiling spindles and heads are moved axially to approach and almost meet at the central wire bending device. At the outer end of this inclined side 75a, the edge of the cam is provided with a slight raised portion 75b which causes slight further axial approach of the coiling heads to cause their flats 129 to engage the bight 120 of the wire blank to form and set it. From this point 75b, the edge of the cam 75 slightly recedes as at 75c so that the coiling heads rotate clockwise and separate as the wire coiled springs build up or lengthen on the arbor from immediately adjacent the bight or angular portion 120 progressively outward to the free ends of the arms 121, until their requisite length has been made, at which time another raised portion 75d of the cam 75 moves under the roller 73 to cause the heads 54 to again slightly approach each other axially to allow the recoil from the wound springs.

As soon as this is completed, the roller 73 moves rapidly to the left of Fig. 1, into the notch 75¹ to cause the coiling heads to rapidly separate or retract to release the completed spring. It will be noted that the cam 63 has a steep drop notch to rapidly retract the arbor 56 and remove it from the completed spring and the coiling heads 54 prior to final separation of the heads. This coupled with the coiling heads rotating in a direction opposite to their winding rotation will effect the slipping of the spring arms 121 out of the coiling head grooves 128 which permits slight outward spring of the two coils with a consequent slight spread of the bight 120 to release itself from the die 105.

Figure 7:
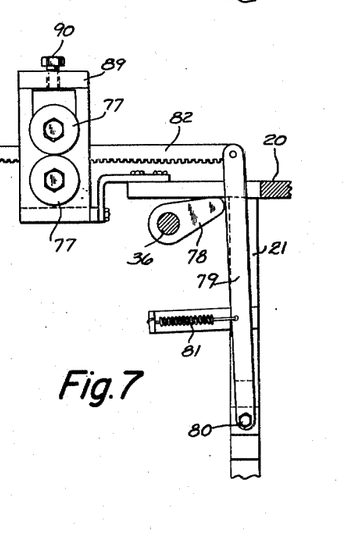
Fig. 7 is a front view of the portion of the machine shown in Fig. 6.

In order that the machine can operate continuously upon a reel of resilient spring wire stock to intermittently feed the wire in a plane parallel to the plane of the spindles 51 and to the proper length for a blank to form a complete double torsion spring, a freely rotatable reel 76 is placed at the left side of the machine and the free end of the wire is gripped between a pair of intermittently driven wire feeding rollers 77 timed with other motions of the machine by reason of the drive for these rollers being taken off of the shaft 36. This shaft has a cam 78, best seen in Fig. 7, operating against the vertical edge of a substantially vertical lever 79 fulcrumed at its lower end at 80 and having a spring 81 to hold it against the cam. The upper end of this lever is connected to one end of a rack bar 82 having its rack teeth resting upon a pinion 83 mounted upon the lower main drive shaft 84 of the wire feed mechanism and operating this shaft in one wire feeding direction only, by means of the well known Hillyard or single directional clutch 85. A countershaft 86 is geared to the same speed as the shaft 84 by the meshing gears 87. The usual wooden brake blocks indicated at 88 are frictionally engaged with both shafts 84 and 86 to simultaneously stop them abruptly when the clutch runs free upon reverse movement of the rack bar 82, thereby stopping the wire feed for an interval of time when the requisite predetermined length of blank has been fed to the wire bending device or coiling station. Obviously, the wire feeding rollers 77 have matching circumferential wire receiving grooves for wire gripping and feed, and are keyed to the main and countershafts which latter are suitably mounted in a pair of end mounting brackets 89 extending from a frame bolted to the top of the machine. The bearings in the front mounting bracket 89 are relatively adjustable with the set screw 90 for varying the wire gripping pressure exerted by the rollers 77 upon the wire fed therebetween.

Figure 8:
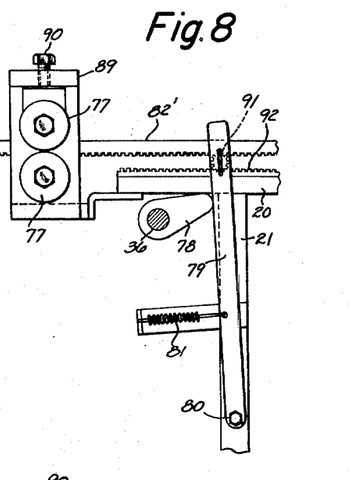
Fig. 8 is a front view similar to Fig. 7 but showing an alternative form of wire feeding mechanism for increasing the length and speed of movement of the wire being fed.

Fig. 8 shows a modification of the wire feed roller drive for increasing the speed and peripheral travel of said rollers 77 to feed more wire than normal within the same time interval, in cases when the machine is adjusted to wind springs having closed, open or a greater number of coils. The rack bar 82' is caused to move faster and farther by having its teeth engaged by a pinion 91 carried in a vertical slot of an operating lever 79 and being driven by its engagement with a stationary rack 92 fixed to the top 20, to rotate the pinion and thereby propel the rack 82'.

Figure 5:
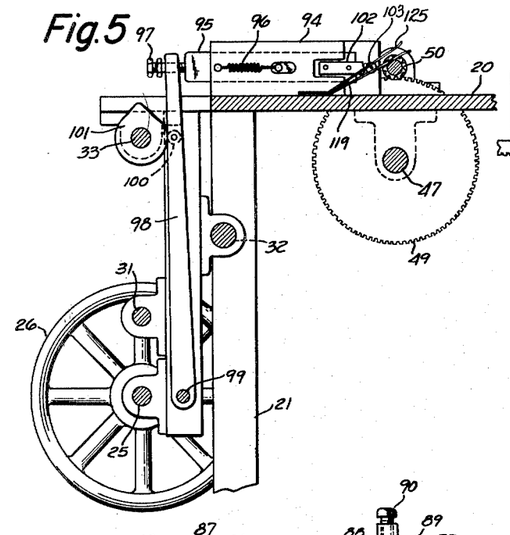
Fig. 5 is a transverse section of a portion of the machine taken on the line 5—5 of Fig. 1.
Figure 6:
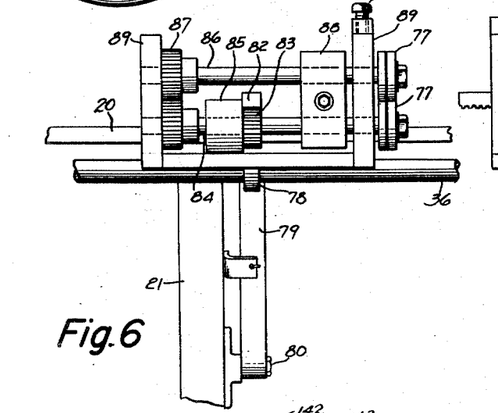
Fig. 6 is a left side elevation of a portion of the machine showing the means for feeding wire from continuous stock.

As best seen in Fig. 1, the wire W is pulled from the reel 76 by the rollers 77 and is guided through a feed tube 93 which is just slightly larger in diameter than the wire stock and extends parallel and in close proximity to the left hand spindle 51 to have a straightening effect upon the wire. The tube 93 guides the wire through an aperture in a nozzle or hard steel bushing 103 having a good cutting edge, this bushing being mounted in a bracket 94 located near the left-hand coiling head 54. This bracket has a guideway at right angles to the spindles 51 for the reception of a reciprocatory cutter bar 95 having an end retracted by a spring 96 beyond the bracket and into engagement with an adjusting screw 97 carried by the upper end of an upright lever 98 pivoted at its lower end as at 99 to the machine frame. A cam engaging roller 100 is carried by the upper end of this lever to be operated by a cam 101 on the shaft 33 at timed intervals. A cutter blade 102 is fixed to the forward side of the cutter bar, as seen in Fig. 5 to be moved across the convex wire delivery nozzle or bushing 103 to cut off a predetermined length of the wire stock sufficient to form a complete spring, when the feeding rollers 77 have stopped their feeding movement, after which the cutter bar is immediately retracted by the spring 96. The cutter bracket 94 is slotted and held in laterally adjusted positions by set screws 104 passing through these slots and threaded into the top 20.

Very novel in this machine is the manner in which the predetermined wire length, which we will designate as a wire blank B, is mechanically handled and transmitted to the central spring forming station or wire bending device located centrally of the machine and between the two coiling spindles or heads. Mounted equidistant from the two coiling heads and adjustably fixed to the table top is a wire bending device including stationary bending die 105 which is an elongated body having vertical sides tapering toward a horizontally rounded vertical front free end or wire bending surface or portion. Adjacent to this front wire forming or bending end and extending through the opposite tapered sides, is an aperture 106, through which the arbor 56 moves entirely transversely across the wire bending device or die 105 in entering and leaving the left-hand coiling head 54, since this aperture is in exact alignment with the longitudinal axis of the two spindles and arbor. The sides of the die surrounding the aperture 106 are slightly hollow-ground to receive and form opposite sides of the bight 120 with slight inward deflection. The die 105 is vertically spaced above the table top and extends at right angles to the spindles in a plane parallel with the top, to be adjustably mounted in a guideway of a bracket 107 bolted to the top. This adjustment is at right angles to the common axis of the coiling heads 54 and spindles so that the eye or aperture 106 can be perfectly aligned with the axis of the arbor and in order that different length bight portions may be formed in the springs when desired, which would require another eye or eyes 106 to be drilled through the die 105 whereby it can be moved further across the axis of the arbor. The die 105 serves as a wire holding means to prevent the wire blank from turning on the axis of its coils as they are formed, due to the bight portion of the blank engaging the free vertical end of the die. A series of these eyes in the stationary die 105 will make for adjustment of the die in either direction across the arbor axis and for various length bight portions in the double torsion springs. The front wire bending portion of die 105 is spaced forwardly from the common longitudinal axis or path of movement of the arbor means 56 and the coiling heads 54. As best appreciated from Figure 9, the opening 106 which receives the arbor 56 is spaced rearwardly of the vertical forward wire bending edge of die 105 so that when the wire bight 120 has been formed around or across this vertical edge, and an arm 121 of the blank is started to be wound on the arbor by a coiling head, the wire blank and bight will have a rotational tendency about the arbor axis, but will be prevented from rotating by the arch of the bight abutting said vertical edge by the rotational tendency imparted to the blank by the coiling head. It will be noted from Figure 9 that the length of the wire bight 120 from its arch to the arbor axis is like a crank arm or radius relative to this arbor axis represented by the arbor opening 106 which is utilized, and that any arc attempted to be described by the arch of the bight due to coil winding will be intersected and stopped by the elongated forward vertical edge of the die 105 to prevent the bight and blank from swinging about the arbor axis and becoming disengaged from this vertical edge.

Under some atmospheric and wire stock material conditions, the bight portions 120 may adhere to the die 105 and may not fall by gravity therefrom. In such cases, a power operated ejector or stripper is employed, with power therefor being derived at timed intervals from a cam 141 shown in Fig. 4 keyed to the counter-shaft 39 behind the stationary die 105. A cam operated bell crank lever 142 is fulcrumed at 143 on a suitable support 145 on the top 20 with a roller 146 at its lower end engaging the cam, and its upper end having a series of apertures, in one of which is pivotally connected one end of a link 147. The other end of this link is pivotally connected in one of a series of apertures in a lever 148 fulcrumed at 149 on a suitable stand rising from the top 20 adjacent the die 105. This fulcrum end of the lever has the sleeve 150 of a depending sweep arm 151 connected thereto. The sweep arm is arranged in the vertical plane of the die 105 above the same and spaced back from its free end and is provided with a forked ejector composed of a pair of pivoted depending ejector fingers 152 straddling the die 105 and pressed against opposite sides of the die by a tension coiled spring 153 connecting said fingers. The cam 141 automatically operates this mechanism, when the arbor and spindles are almost fully retracted after the formation of a complete double torsion spring, to cause the fingers 152 to follow the sides of the die 105 forwardly beyond the free end of the die to sweep the bight of the completed spring clear of the die, should it tend to stick thereto from magnetism, static electricity or stock wire materials or coatings such as lead and the like employed in wire drawing. Due to the tapered and rounded shape of the free end of the die, and the spring 153 pressing of the fingers, they will readily part and swing rearwardly by a spring 154 to their normal positions on opposite sides of the die, as the high point of the cam 141 passes the roller 146.

Figure 9:
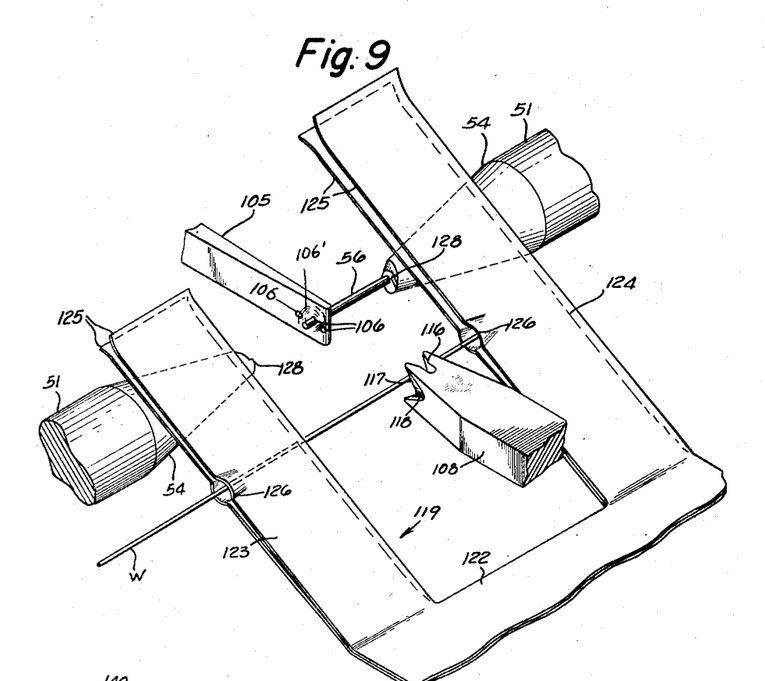
Fig. 9 is an enlarged perspective view of the wire guides, the forming dies, the wire coiling heads and the arbor, this view showing the relative positions of these elements near the beginning of the spring forming cycle and immediately following the relative positions shown in Fig. 1.
Figure 11:
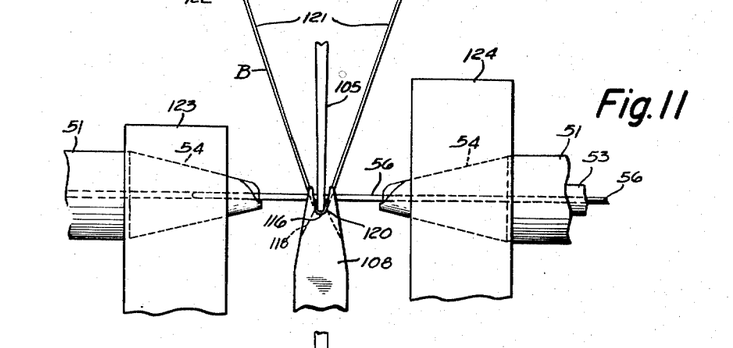
Fig. 11 is a view similar to Fig. 10 but showing the movable die advanced toward the stationary die to bend the length of wire into substantially V-shape with its bight portion bent around the front end of the stationary die and with its two arms or ends diverging rearwardly over the arbor.

Cooperating with the stationary die to bend the wire blank B upon itself into substantially V-shape, and reciprocable in the same vertical and horizontal planes therewith, is a movable second bending die 108 secured to a reciprocatory die bar 109 slidably mounted in a guideway of a block 110 bolted to the table top parallel with the cutter 95 and normally retracted away from the stationary die by a coiled spring 111. The die 108 is operated in proper sequence by a second automatic cyclically operable mechanism including a lever 112 fulcrumed at its lower end by the shaft 99 to be moved by a properly contoured cam 113 on the shaft 33 engaging with a contact roller 114 carried near the upper end of this lever. The upper end of this lever 112 is provided with a set screw 115 to engage and cause reciprocation of the die bar 109, and provides for accurate adjustment of the rear end of the die 108 to properly clamp the medial portion of the wire blank B against the rounded end or bending portion of the stationary die so as to hold the blank in position at the spring forming station after it has been severed from the continuous wire stock W. This screw 115 may be provided with a rubber cushion bearing against the end of the die bar 109 to prevent undue stress upon the wire and die from mechanical operation. Fig. 4 shows the contour of the cam 113 to cause the rear end of the movable die 108 to clamp and bend the wire blank B against the stationary die 105 after the wire blank has been cut off and the coiling heads form the bight of the wire blank and start coiling them around the arbor, at which time the movable die 108 is rapidly retracted to the position shown in Fig. 1 to disengage the formed wire and move away therefrom ready to reload with another length of wire at the appointed time. The special formation of the rear end of this die is best seen in Fig. 9, and it will be noted that it is tapered outwardly and is square in cross-section with a vertical U-shaped kerf or groove 116 at its rear end to fit about the front end of the stationary die, and has a horizontal transverse substantially U-shaped kerf or opening 117 with beveled or relieved sides 118 to receive the medial portion of the wire blank B and move it rearwardly toward the stationary die 105 to bend it into substantially V-shape after the blank has been cut off from the wire W, as shown in Fig. 11. The kerf 117 is large enough to admit the coiling heads to engage and set the bight 120 and engage the arms 121 immediately adjacent to the bight.

The fine No. 90 wire stock W being propelled by the wire feeding rollers 77 through the guide tube 93 and feeding nozzle 103 with its free end projecting freely, it is expedient to provide wire guide means 119 for guiding it across the path of movement of the movable die and more particularly across the path of the horizontal kerf 117 whereby forward projection of this die will cause its kerf 117 to engage the wire transversely and carry it to the rounded end of the stationary die to clamp and then bend the wire blank around the end thereof into substantially V-shape with a bight or angular portion 120 and a pair of rearwardly diverging arms 121, extending transversely across the axis of the arbor with one arm 121 positioned at each side of the die 105 or bending device. This guide means 119 may assume different forms, but the simplest is formed from an H-shaped piece of tin or other flexible metal folded upon itself along the bridge of the H to form a generally U-shaped guide having a double thickness anchoring portion 122 screwed to the table top, with each of the arms 123 and 124 of the U-shaped form of doubled thickness of metal and bent to incline upwardly from said top to overlap over the two coiling heads 54 and arbor. Each arm is thus provided with a pair of outwardly and rearwardly diverging leaves 125 between which the wire stock is fed, and these arms being arranged on opposite sides of the movable die 108 and central spring bending device, they serve in retaining the wire in a plane where it is bound to be engaged in the kerf 117 of the die 108 when the latter is projected toward the forming station, and also to serve in guiding the wire upwardly and over the coiling heads and arbor. The edges of the leaves may be deflected outwardly as lips 126 in the vicinity where the wire is projected axially from the nozzle 103 to facilitate entry of the free end of the wire between the leaves of the two guide arms.

The coiling heads 54 are mounted for rotation upon a common axis coincident with the axis of the arbor means 56 and are adapted to be rotated in unison in the same direction; in one direction for winding the wire into coiled springs on the non-rotatable arbor, and in the opposite direction to compress the coils of the springs to allow spring recoil and set the same, and while separating or retracting to release the springs. Each coiling head is of solid metal and is provided with an axial bore for the sliding association of the arbor therein, the inner end of the bore being threaded for attachment to the hollow sleeve 53 as previously described. Each head is formed from cylindrical stock having one end 127 of conical or tapered shape and terminating in a generally transverse end which has a somewhat radially extending eccentric wire engaging tooth having a grooved shoulder 128, the outermost axially projecting portion of which is provided with a wire forming flat surface 129 disposed approximately in a plane at right angles to the axis of the head. From this flat forming surface, the transverse end of the head is relieved or tapered off into a somewhat spiral conical surface 130 ending at a different elevation than the flat forming surface 129 at the other end of the grooved shoulder, so that when the head rotates to wind a spring, the grooved shoulder 128 receives and catches the arm 121 of the blank to wind it upon the arbor. The die 108 retracts rapidly after the heads 54 move in to engage the bight, and the arms 121 being resilient, slip past the dies and ejector.

Figure 12:
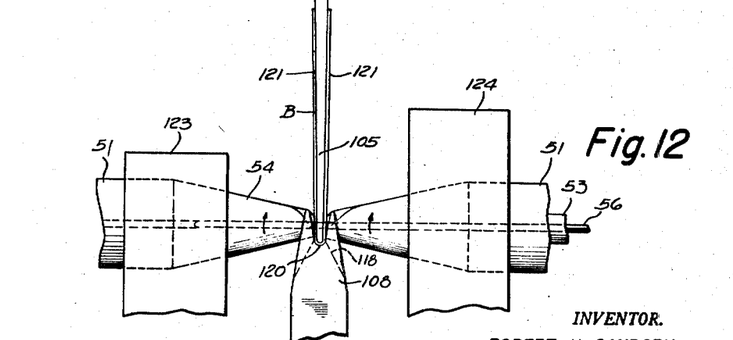
Fig. 12 is a view similar to Fig. 11 but showing the coiling heads fully advanced axially toward each other to exert opposed forces upon the bight of the wire length to form and set it against opposite faces of the stationary die and to bend the two ends of the wire into substantially parallel relationship.
Figure 13:
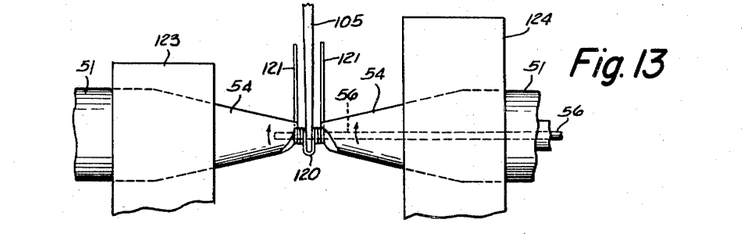
Fig. 13 is a view similar to Fig. 12 but showing the coiling heads rotating in the winding direction and engaged with the ends or arms of the wire to wind them upon the arbor into a double torsion spring while receding away from the stationary die and from each other.
Figure 15:
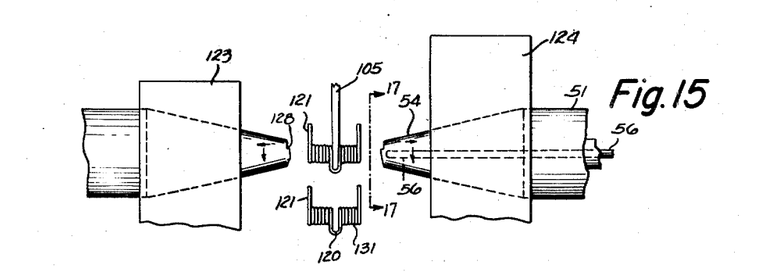
Fig. 15 is a view similar to Fig. 14 but showing the arbor substantially fully retracted so as to be disengaged from the spring and showing the coiling heads sufficiently retracted to release the spring, the released spring being shown in dotted lines out of its normal gravitational position beneath the full line showing of the same spring ready to fall off of the fixed die.
Figure 16:
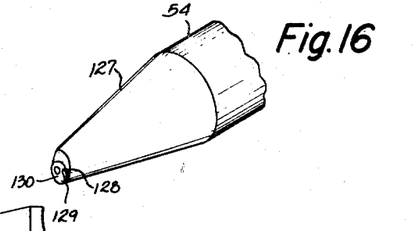
Fig. 16 is an enlarged perspective view of one of the coiling heads.
Figure 17:
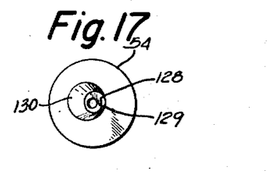
Fig. 17 is an end elevation of the coiling head shown in Fig. 16.

This fully automatic machine operates to produce a complete double torsion coiled spring for each complete revolution of the shaft 32 and crank arm 40. The operation of the machine causes the various steps to occur in the process in the following sequence. As the machine starts operation from the positions shown in Fig. 1, the winding spindles 51 and arbor 56 are fully retracted or separated in their longitudinally spaced initial positions as shown in Fig. 1, while the wire feeding rollers 77 are feeding the wire through the wire nozzle 103 and leaves 125 of the guide arms 123 and 124 into the path of movement of the movable die 108, which, at this time, is being moved rearwardly by the second automatic cyclically operable mechanism toward the stationary die 105. The movable die continues to advance, catching the medial portion of the wire blank B in the kerf 117 to move it into engagement with the front vertical edge or bending portion of the stationary die 105 to clamp the blank and prevent it from falling out of the machine, at the exact time that the wire feed ceases and the wire cutter 95 cuts the wire to sever the blank from the continuous stock, whereupon this cutter retracts to its idle position ready to move again during the next cycle of operation of the machine after the movable die bends the medial portion of the blank into an angular or bight portion 120 with a pair of diverging arms 121 supported across the arbor 56. During this wire transmission or placement phase, the arbor 56 has been fully advanced independently of the coiling heads 54 to an operative position by means of the first automatic cyclically operable mechanism including lever 60 up to the spring wire bending device to extend through the aperture 106 in the stationary die 105 and into the axial opening in the left hand coiling head 54, as shown in Fig. 11, to an operative position wherein the arbor extends transversely entirely across the die 105 to provide a winding portion extending from each side of die 105 while the two coiling heads are rotating and are approaching each other lengthwise of their common axis from their spaced initial positions by means of the third automatic mechanism including cranks 65 and compound leverage 67—71 to simultaneously present their flat forming surfaces 129 through the kerf 117 and against opposite sides of the bight 120 of the blank and press it into the hollow-ground portions 106' with sufficient axial force to actually form and set this bight permanently at the exact moment the heads momentarily pause in rotation due to pitman block 40 passing dead center preparatory to reversing direction of rotation of the coiling heads, thereby bringing the arms 121 of the blank into closer relationship to bear against the flat opposite sides of the stationary die 105, and lie across the arbor 56 as shown in Fig. 12 after which the movable die 108 retracts. The reverse direction of rotation of the heads causes them to rotate so that their grooved shoulders 128 catch the two arms 121 of the blank immediately adjacent the bight 120 and to start winding them progressively outward to the free ends of the arm 121 and upon the non-rotatable arbor 56 as the heads recede from each other relative to the arbor at the desired speed depending upon the pitch to which the coils of the springs are wound, as depicted in Fig. 13. The arch of the bight 120 engaging the forward vertical end of the die 105 prevents rotation of the wire blank during formation of the arms 121 into coils. When the requisite number of coils or convolutions (six in this illustration) are wound, the pitman block in way 40 has just passed dead center to reverse the direction of rotation of the gears 49 and coiling spindles with their heads 54, as the slight land 75d on the cam 75, through the mechanism 67 and 69, moves these heads axially toward each other to axially compress the springs 131 to allow spring recoil and set them into axial alignment ready to be automatically ejected, and to insure the continued engagement of the arms 121 in the coiling grooves 128, as seen in Fig. 14. As the direction of rotation of the heads is reversed to disengage the teeth of the coiling heads from the ends of the coils, the notched cam contour on the cam 75 then causes the heads to immediately retract away from each other after which the arbor is axially retracted by the cam 63, out of its operative spring supporting position so as to be retracted entirely within the right hand head and spindle to allow quick release of the completed double bodied torsion spring from the machine by the separation of the heads 54, as depicted in Fig. 15. The natural recoil of the springs will free the bight portion of some wire material, so that when the support afforded by the heads and arbor is removed from the spring, the bight will be released from the stationary die to fall by gravity therefrom or to be positively ejected as previously described. At this stage, the coiling heads are in retracted initial spaced positions ready for the next cycle to repeat the foregoing motions and operations. While the heads and arbor are retracting, the wire feed is again starting to drive the feed rollers 77 for feeding another length of wire stock to the spring forming station to automatically repeat another cycle of operations of the machine. Since this machine automatically produces about 52 springs per minute, one complete spring is produced almost every second, demonstrating that a complete cycle of all of the foregoing motions and operations automatically occurs in a trifle over every second, which is a tremendous speed, accounted for by the fact that it is entirely automatic and requires no human help whatsoever. So well co-ordinated are the various motions carried on by the machine, that it may be supplied with a large enough reel of wire stock, be started and left entirely unattended, and it will produce over 25,000 complete double torsion springs in every 8 hours and will produce springs at this rate until it exhausts the wire supply, without requiring an operator's attention, except to replenish the wire supply.

Figure 18:
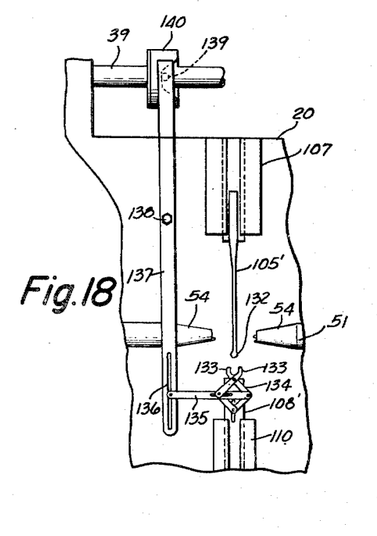
Fig. 18 is a top plan of a modified form of bight forming mechanism.
Figure 19:
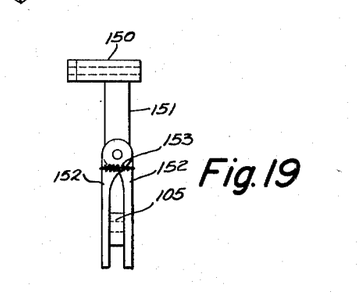
Fig. 19 is a front elevation of the power ejector mechanism.
Figure 21:
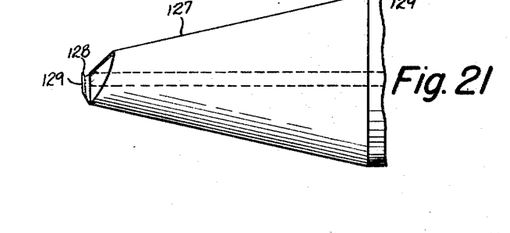
Fig. 21 is an enlarged side elevation of one of the coiling heads and Fig. 22 is a side elevation of another form of ejecting mechanism for the mechanism shown in Fig. 18.
Figure 22:
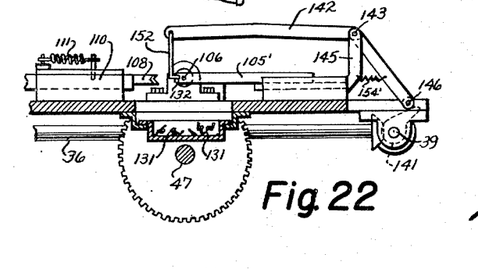

This machine is also versatile so far as concerns mechanism for forming various shaped bight portions for the springs. Fig. 18 illustrates a modified form of mechanism for forming the bight with a nearly circular configuration, and includes a stationary die 105' provided with a cylindrical free end 132 and an eye like 106 of Fig. 9 for the passage of the arbor 56 upon which the two coiled springs are wound as previously described. Cooperating with the free end 132 of the stationary die 105' are a pair of bending and forming jaws 133 fulcrumed upon a movable die bar 108' operated like the bar 108 of the preferred form in the preceding figures. The jaws being normally separated provide the equivalent of the vertical kerf 116 and each jaw 133 is formed with a horizontal kerf like 117 and 118 to engage the wire to move it into engagement with the stationary die 132 as in the preceding form of invention. These two jaws are operated by a toggle lever 134 mechanism including a slotted operating bar 135 which is reciprocated at the proper intervals by a slotted connection 136 with a lever 137 fulcrumed to the top at 138, and having a roller 139 operated by a cam 140 on the shaft 39. This cam is contoured to be coordinated with the timed reciprocations of the die bar 108' in order that the jaws 133 will be closed about the wire bight to bend and form it into circular form about the die 132 and then open and retract therefrom. Thus, the wire bight possesses a circular form which closely embraces the cylindrical die 132 so that it cannot tilt relative to the axis of said die when the wire arm is being coiled, thereby holding the bight engaged with the die 132 and preventing its rotational tendency about the arbor axis during coil winding. The coiling heads approach as in Fig. 1 to pick up and wind the ends of the wire blank upon the arbor 56 as in the preceding form of invention. The power operated ejector shown in Fig. 4 can be employed if necessary, by arranging the fingers 152 to move vertically along the cylinder 132 of the stationary die to strip the springs therefrom, as shown in Fig. 22.

The adjustability of the pitman block 40a lengthwise in its way, different distances from its center, provides for highly calibrated fine adjustments in the number of turns or revolutions the spindles and coiling heads are to make. The adjustability of the other end of the pitman along the lever 43 provides for a greater range of adjustment of this novel drive mechanism.

It will be understood that the coiling heads and spindles can be rotated in either direction by the simple adjustment of the pitman block 40a at one side of the center of the driver disk 39a on shaft 32, or the other side thereof, depending upon whether the springs are to be wound right or left hand. To wind the coiled springs in a direction opposite to the one illustrated would require the construction of the coiling heads 54 to be reversed, and to move the wire guides 123 and 124 so that the wire blank will be guided below the arbor instead of above it as in the form just described.

Also fine adjustments to the extent of reciprocation of these spindles 51 can be made by changing the angular position of the heads 54 and cam 75 with respect to the shaft 39, adjusting the contact piece 70 along the lever 67 and turning the turn-buckles on rods 69 even while the machine is operating, and connecting the rods 69 with the desired hole or along the slots in levers 65. Any one or all of these adjustments can be used to achieve the desired extent of reciprocation of the spindles. To recapitulate what each of the first, second and third automatic cyclically operable mechanisms mainly includes, it will be appreciated from the foregoing description that the first automatic cyclically operable arbor moving mechanism includes the rod 57, lever 60 and cam 63. The second automatic cyclically operable die moving mechanism includes the lever 112 and cam 113. The third automatic cyclically operable coiling head mechanism includes, as a first part or means, the pinions 50 and associated mechanism for rotating the spindles 51 and coiling heads 54 in opposite directions; and, as a second part or means, the cranks or levers 65 and associated mechanism for moving the coiling heads 54 along their common axis to different longitudinal extents and at different rates of speed. All three of these mechanisms are operated from the common source of power 22, and are automatically power coordinated and timed to operate in continuous cycles.

When a single one piece arbor 56 is employed as in Fig. 1, it is projectable to an operative position from one spindle and coiling head, through the opening 106 in the die 105 or bending device, into the axial opening in the other coiling head 54 so that the two winding portions of the arbor, upon each of which a coiled spring is wound, extend from opposite sides of the bending device. Thus, this arbor is extendable axially of the main operating axis, which is the axis of the arbor and coiling heads; and when in an operative position, extends transversely entirely across the bending device from one side thereof to the other side thereof.

When a two-piece arbor is employed as in Fig. 23, the two separate arbors 56' provide the winding portions upon which wire arms 121 are wound into springs, and these winding portions are also arranged at opposite sides of the bending device, just as they are in Fig. 1.

All other cams in the machine can be angularly adjusted on their shafts or their actuating surfaces can be easily altered to change the extent of, or synchronize the operations of the machine.

From the foregoing description and drawings, it is believed that the construction and operation of the machine will be fully understood, and that various changes in the relationship and construction of the various parts can be made without departing from the scope of the claims.

I claim:

1. In an automatic spring making machine, the combination of two coiling heads rotatable about and axially movable along a common axis and having longitudinally spaced initial positions, a centrally located fixed first bending die having a front wire bending portion spaced forwardly from said axis and being formed with an opening registering with said axis, a second bending die at the front of the first die initially spaced therefrom and having a wire bending portion for cooperation with the front wire bending portion of the first die, an elongated non-rotatable arbor member having an operative position wherein a winding portion thereof extends axially through said opening and at both sides of the first die, mechanism cyclically operable for feeding successive lengths of wire to a predetermined position between the first and second dies, mechanism cyclically operable after each wire feeding for moving the second die rearwardly to engage the fed wire and bend it around the front portion of the first die so as to form a bight portion embracing said first die and so as to form two rearwardly extending arms at the sides of said first die and adjacent the arbor member which mechanism thereafter serves to move the second die forwardly to disengage the wire, mechanism cyclically operable after each wire bending for moving said coiling heads axially toward each other and for rotating them so that they engage the arms of the wire to wind them on the winding portion of the arbor member so as to form coils at the sides of the first die which mechanism serves during coil winding to move the coiling heads away from each other in conformity with the increasing length of the coils as they are wound and which mechanism thereafter serves to return the coiling heads to their spaced initial positions, and mechanism cyclically operable after each coil winding for moving the arbor member axially out of its said operative position so as to disengage it from the wire coils and for thereafter returning the arbor means to its said operative position.

2. An automatic spring making machine as set forth in claim 1, wherein the mechanism for axially moving and for rotating the heads is constructed and arranged to move the coiling heads slightly toward each other upon the completion of coil winding and is further constructed and arranged to thereafter return the coiling heads to their initial spaced positions.

3. An automatic spring making machine as set forth in claim 1, wherein there are two similar levers for moving the coiling heads axially and a single first lever connected with the said two levers for moving them in opposite directions, wherein there is a second single lever and a cam for oscillating it to a predetermined extent, and wherein there is an adjustable connection between the first and second single levers for changing the extent of movement of the first single lever and of the two levers connected therewith.

4. In a spring making machine, the combination of a supporting structure having a main operating axis, a wire bending device having a wire bending portion positioned forwardly of said axis, means to press a length of wire against said bending portion to form it into a bight portion embracing said wire bending portion and so as to form said wire into an arm positioned at a side of said bending portion to extend transversely across said axis, non-rotatable arbor means having mechanism to move said arbor means lengthwise of said axis from an initial position to an operative position wherein a winding portion thereof extends from one side of said wire bending portion and is retractable along said axis to said initial position, and a wire coiling head rotatable about and axially movable relative to said arbor means along said axis from an initial position to an operative position, mechanism for moving said coiling head independently of said arbor means to engage said wire arm and wind it into a coil on said winding portion of said arbor means at a side of said wire bending portion as said bight abuts against said wire bending portion to prevent rotation of said coil about its axis on said arbor winding portion while said coil is being wound thereon, said arbor means being retracted to said initial position independently of said coiling head by its said mechanism after said winding of said arm to release said coil and thereafter being returned to said operative position for winding another spring.

5. In a spring making machine, the combination of a supporting structure having a main operating axis, a wire bending device having a wire bending portion spaced and fixed forwardly of said axis, a die having mechanism to move said die from a position spaced from said bending portion up to said wire bending portion to press a length of wire against said bending portion to form it into a bight portion embracing said fixed wire bending portion and so as to form said wire into an arm positioned at each side of said bending portion to extend transversely across said axis, said die mechanism thereafter retracts said die away from said bending portion, non-rotatable arbor means having mechanism to move said arbor means lengthwise of said axis from an initial position to an operative position wherein winding portions thereof extend from both sides of said fixed wire bending portion and are retractable along said axis to said initial position, two wire coiling heads rotatable about and axially movable relative to said arbor means along said axis and having initial spaced positions lengthwise of said axis and on opposite sides of said fixed wire bending portion, mechanism for moving and rotating said heads along said axis independently of said arbor means to engage said wire arms and wind them into coil springs on said winding portions of said arbor means, and said arbor means being retracted to said initial position independently of said coiling heads by its said mechanism after said winding of said arms to release said coil springs and thereafter being returned to said operative position for the winding of another spring.

6. In a spring making machine as set forth in claim 4, wherein said mechanism to move said head along said axis includes a main lever operably connected with means connected with said head for moving it axially to and from said operative position and a single first lever connected to said main lever for moving it in opposite directions, and said mechanism includes a second single lever and a cam for oscillating it to a predetermined extent and wherein there is an adjustable connection between said first and second single levers for changing the extent of movement of said first single lever and of said main lever connected therewith.

7. In a spring making machine as set forth in claim 4, wherein said mechanism for axially moving said coiling head is constructed and arranged to move said head slightly toward said wire bending portion upon the completion of said coiled spring winding and is further constructed and arranged to thereafter return said coiling head to its initial position.

8. In a spring making machine as set forth in claim 4, wherein said mechanism for rotating said coiling head is constructed and arranged to rotate said head to a predetermined extent in winding direction and to thereafter rotate said coiling head in an opposite direction after coiled spring winding while moving said head toward its initial position.

9. In a spring making machine as set forth in claim 4, in which said arbor means is an elongated arbor which is movable lengthwise of said axis and transversely entirely across said bending device to said operative position which is spaced rearwardly of said fixed wire bending portion.

10. In a spring making machine as set forth in claim 5, in which said arbor means is an elongated arbor mounted in an axial opening in one of said heads and is movable axially of said axis and transversely entirely across said bending device and into an axial opening in the other of said heads to reach said operative position.

11. In a spring making machine as set forth in claim 5, in which said heads are provided with means to press said wire arms against said wire bending device to set said bight portion when said mechanism moves said heads to engage said arms.

12. In a spring making machine as set forth in claim 5, in which said movable die has a rearwardly open groove to receive said wire bending portion to form said bight and arms and has an opening to expose the sides of said bending portion and through which said heads engage said wire arms while said die remains engaged with said bight.

13. In a spring making machine as set forth in claim 5, in which means are provided to intermittently feed wire of predetermined length parallel to said axis and between said wire bending portion and said movable die when said die moves away from said bending portion.

14. In a spring making machine as set forth in claim 5, in which said arbor means moving mechanism moves said arbor means into said operative position prior to said wire forming, and in which said die mechanism causes said die to remain engaged with said bight portion until said coiling heads engage said wire arms and thereafter causes said die to disengage said bight portion before said coiling heads finish said coil winding.

15. In a spring making machine as set forth in claim 5, in which said wire bending device is stationary and extends transversely across said axis and is provided with an opening aligned with said axis for projection therethrough of said arbor means.

16. In a spring making machine, power drive means, a supporting structure, a stationary wire bending device mounted thereon and having sides and a fixed front bending portion, a movable die for cooperation with said bending portion, said die being movable toward said front wire bending portion and having a rearwardly open groove to receive said front wire bending portion and having an opening in its side to expose a portion of a side of said bending portion, the combination therewith of non-rotatable arbor means having its axis spaced rearwardly of said fixed bending portion, said arbor means being movable lengthwise of said axis to and from an operative position wherein a winding potrion thereof extends at one side of said bending device, mechanism connected to said power drive means to move said arbor means to and from said operative position, a coiling head rotatable about and axially movable lengthwise of said axis and having an initial position spaced from said bending device, said head having wire engaging and winding means, mechanism connected to said power drive means and operable to move said die to press a length of wire against said fixed bending portion so as to form an angular portion crosswise of said bending portion and so as to form an arm extending at the side of said stationary bending device and transversely across said axis and said arbor winding portion, which mechanism is constructed and arranged to thereafter move said die away from said bending portion and away from said angular portion of said wire, coiling head mechanism connected to said power drive means and operable after positioning of said arbor means into said operative position to move said coiling head independently of said arbor means toward said bending device to project said wire engaging and winding means of said coiling head through said opening in the side of said movable die to engage said wire arm while held across said axis and winding portion in position by said movable die and to press said wire arm against the adjacent side of said bending device, which coiling head mechanism has means to rotate said head to catch said wire arm and move said head away from said bending device and toward its initial position independently of said arbor means to wind said arm on said winding portion of said arbor means to form a coiled spring as said angular portion abuts against said front bending portion to prevent rotation of said coil spring about its axis on said arbor winding portion while being wound thereon, said arbor operating mechanism being coordinated with said other mechanisms to operate after each coil spring winding to move said winding portion of said arbor means out of said operative position independently of said head to disengage it from said coiled spring and for thereafter returning said winding portion of said arbor means to said operative position, and all of said mechanisms having means constructed, arranged and coordinated with each other to operate as aforesaid.

17. In a spring making machine operable in successive cycles of operations, power drive means, a supporting structure, two coiling heads mounted by said structure and being rotatable about and axially movable along a common axis and having spaced initial positions lengthwise of said axis, said heads having wire catching and winding means, a stationary wire bending device having a front wire bending portion spaced and fixed forwardly of said axis and located between said spaced initial positions of said coiling heads, a movable die for cooperation with said bending portion; the combination therewith of non-rotatable arbor means movable lengthwise of said axis and relative to said coiling heads to and from an operative position wherein winding portions thereof extend at both sides of said wire bending portion, a first mechanism connected to said power drive means and constructed and arranged to move said arbor means to and from said operative position, a second mechanism connected to said power drive means and constructed, arranged and coordinated with said first mechanism to move said die rearwardly to press a length of wire against said fixed bending portion to form it into a bight portion embracing said fixed bending portion and so as to form said wire into an arm positioned at each side of said bending portion and extending transversely across said axis which second mechanism includes means constructed, arranged and coordinated to thereafter cause said die to move away from said bending portion and away from said formed wire, a third mechanism connected with said power drive means and including means coordinated with said first and second mechanisms for operation after positioning of said arbor means into said operative position and constructed and arranged to axially move said coiling heads along said axis toward each other and relative to said arbor means to cause said wire catching means to engage said wire arms, said third mechanism including means constructed, arranged and coordinated with said first and second mechanisms to operate after the last said named movement of the coiling heads for rotating said heads so that said wire catching means catch said wire arms to wind them on said winding portions of said arbor means to form coiled springs at both sides of said wire bending device, said first mechanism including means operating after each coil spring winding and constructed, arranged and coordinated with said second and third mechanisms to move said arbor means along said axis in one direction sufficiently to move said winding portions thereof out of said operative position to disengage them from said coiled springs and further constructed and arranged to thereafter return the arbor means in the opposite direction to restore said winding portions thereof to said operative position.

18. In a spring making machine, a supporting structure, a coiling head mounted by said structure and being rotatable about and axially movable along an axis from an initial position to an operative position and return, said head having wire engaging and winding means, a wirebending device constructed, arranged and operable to bend a length of wire into a bight portion spaced and fixed forwardly of said axis and with an arm extending rearwardly across said axis at each side of said bending device; the combination therewith of arbor means movable lengthwise of said axis relative to said bending device and relative to said coiling head and having an operative position wherein winding portions of said arbor means extend at both sides of said bending device, mechanism constructed, arranged and operable after each said wire bending for moving said coiling head relative to said arbor means and lengthwise of said axis toward said bending device and for rotating said head so that it engages an arm of the wire to wind it on a winding portion of said arbor means to form coils at the side of said bending device which mechanism is constructed and operated to thereafter return said coiling head independently of said arbor means to its initial position spaced from said bending device, and mechanism constructed, arranged and coordinated with said first named mechanism and operable after each coil winding to move said arbor means relative to said head and out of said operative position to disengage it from the wire coils and to thereafter return said arbor means to its operative position.

19. In a spring making machine, power drive means, a supporting structure, a coiling head mounted by said structure and being rotatable about and axially movable along an axis from an initial position, said head having wire engaging and winding means, a first wire bending die having a front wire bending portion spaced and fixed forwardly of said axis, a movable second wire bending die at the front of said first die for cooperation with said first die, the combination therewith of non-rotatable arbor means movable relative to said coiling head and to said fixed bending portion into an operative position wherein winding portions thereof extend along said axis at both sides of said fixed bending portion, first mechanism connected to said power drive means to move said arbor means relative to said coiling head to said operative position, second mechanism connected to said power drive means and connected, arranged and coordinated with said first mechanism for moving said second die rearwardly to engage an interposed length of wire and bend it around said fixed bending portion of said fixed first die so as to form a bight position embracing said first fixed die and so as to form two rearwardly extending arms at the sides of said first die and across said axis which second mechanism has means to thereafter move said second die forwardly, third mechanism connected to said power drive means and constructed, arranged and coordinated with said second mechanism and operable after each said wire bending to move said coiling head relative to said arbor means and lengthwise of said axis toward said first die and having means to rotate said head so that it engages a rearwardly extending arm of the wire to wind it on a winding portion of said arbor means to form a coil at the side of said first die which third mechanism has means to thereafter return said coiling head independently of said arbor means to its initial position, and said first mechanism being connected with said power drive means and connected with said second and third mechanisms to operate after each coil winding to move said arbor means relative to said head and out of said operative position to disengage it from the wire coil and to thereafter return said arbor means to said operative position.

20. In a spring making machine, a supporting structure, two wire coiling heads mounted thereon and being rotatable about and axially movable along a common axis and having spaced initial positions lengthwise of said axis, a wire bending device located between said heads and including a wire bending portion fixable in a position spaced forwardly of said axis and a movable die having means to form wire upon said bending portion, arbor means movable to and from an operative position wherein winding portions thereof extend along said axis at both sides of said wire bending portion, a first automatically cyclically operable mechanism to move said arbor means to and from said operative position, a second automatic cyclically operable mechanism to move said die to press an interposed length of wire against said bending portion to form it into a bight portion embracing said bending portion and to form an arm at each side of said bending portion extending transversely across said axis which second mechanism thereafter moves said die away from said formed wire and bending portion, a third automatic cyclically operable mechanism to move said heads along said axis relative to said arbor means and being operable after positioning of said arbor means into said operative position to move said heads toward each other to engage said arms immediately adjacent said bight portion, said third mechanism automatically operating to rotate said heads to catch said wire arms immediately adjacent said bight portion and to move away from each other relative to said arbor means and toward their initial spaced positions to wind said arms upon said winding portions of said arbor means and into coils started immediately adjacent to said bight portion and wound progressively outward to the free ends of said arms to thereby form coiled springs at both sides of said wire bending device, and said first mechanism operating automatically after each coiled spring winding to move said winding portions of said arbor means relative to said heads lengthwise of said axis and out of said operative position to disengage them from said coiled springs and to thereafter return said winding portions of said arbor means to said operative position, all of said mechanisms being automatically power coordinated and timed to operate in continuous cycles.

References Cited in the file of this patent

UNITED STATES PATENTS

| Number | Name | Date |
|---|---|---|
| 145,250 | Spencer | Dec. 2, 1873 |
| 250,329 | Alpress | Dec. 6, 1881 |
| 399,160 | Rice | Mar. 5, 1889 |
| 468,573 | Millett | Feb. 9, 1892 |
| 487,679 | Morse | Dec. 6, 1892 |
| 500,058 | Ellis | June 20, 1893 |
| 603,175 | Collins | Apr. 26, 1898 |
| 841,634 | Crouch | Jan. 15, 1907 |
| 844,206 | Sommer | Feb. 12, 1907 |
| 887,630 | Hart | May 12, 1908 |
| 911,931 | Armbuster | Feb. 9, 1909 |
| 957,203 | Gail | May 10, 1910 |
| 978,039 | Lang | Dec. 6, 1910 |
| 986,713 | Hoover | Mar. 14, 1911 |
| 1,050,363 | Harter | Jan. 14, 1913 |
| 1,090,401 | Lea | Mar. 17, 1914 |
| 1,189,846 | Lockwood | July 4, 1916 |
| 1,192,631 | Hick | July 25, 1916 |
| 1,192,655 | Lyons | July 25, 1916 |
| 1,282,530 | Bloemaker | Oct. 22, 1918 |
| 1,562,973 | Kuester | Nov. 24, 1925 |
| 1,562,998 | Van Orman | Nov. 24, 1925 |
| 1,641,631 | Hoffman | Sept. 6, 1927 |
| 1,673,185 | Des Combes | June 12, 1928 |
| 1,779,131 | Holness | Oct. 21, 1930 |
| 2,014,833 | Burns | Sept. 17, 1935 |
| 2,296,483 | Smith | Sept. 22, 1942 |
| 2,517,436 | Jones | Aug. 1, 1950 |
| 2,543,370 | Kludt | Feb. 27, 1951 |

FOREIGN PATENTS

| Number | Country | Date |
|---|---|---|
| 3,303 | Germany | Apr. 30, 1878 |
| 323,499 | France | Nov. 11, 1902 |
| 966,467 | France | Mar. 8, 1950 |